(12) United States Patent
Lai et al.

(10) Patent No.: US 6,330,353 B1
(45) Date of Patent: Dec. 11, 2001

(54) METHOD OF LOCALIZATION REFINEMENT OF PATTERN IMAGES USING OPTICAL FLOW CONSTRAINTS

(75) Inventors: Shang-Hong Lai, Plainsboro; Ming Fang, Cranbury, both of NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 08/993,850

(22) Filed: Dec. 18, 1997

(51) Int. Cl.[7] .............................. G06K 9/00; G06K 9/62; G06K 9/68

(52) U.S. Cl. ...................... 382/147; 382/209; 382/220

(58) Field of Search ....................... 382/209, 205, 382/145, 294, 216, 147, 151, 220, 215, 144, 191, 107; 348/126; 486/16; 356/237

(56) References Cited

U.S. PATENT DOCUMENTS

| | | | |
|---|---|---|---|
| 4,475,122 | * 10/1984 | Green | 358/101 |
| 4,672,676 | * 6/1987 | Linger | 382/8 |
| 4,817,184 | * 3/1989 | Thomason et al. | 382/8 |
| 5,173,949 | * 12/1992 | Peregrim | 382/48 |
| 5,265,172 | * 11/1993 | Markandey et al. | 382/17 |
| 5,351,311 | * 9/1994 | Rogers et al. | 382/45 |
| 5,365,597 | * 11/1994 | Holeva | 382/8 |
| 5,455,870 | * 10/1995 | Sepai et al. | 382/147 |
| 5,495,537 | * 2/1996 | Bedrosian et al. | 382/209 |
| 5,495,540 | * 2/1996 | Frankot et al. | 382/294 |
| 5,528,702 | * 6/1996 | Mitsuoka et al. | 382/211 |
| 5,561,722 | * 10/1996 | Watari et al. | 382/209 |
| 5,619,587 | * 4/1997 | Willoughby, Jr. et al. | 382/141 |
| 5,627,905 | * 5/1997 | Sebok et al. | 382/107 |
| 5,764,871 | * 6/1998 | Fogel et al. | 395/127 |
| 5,774,591 | * 6/1998 | Black et al. | 382/236 |
| 5,821,943 | * 10/1998 | Shashua | 345/427 |
| 5,828,449 | * 10/1998 | King et al. | 356/237 |
| 5,946,417 | * 8/1999 | Bonneau et al. | 382/236 |

OTHER PUBLICATIONS

The Computer Science and Engineering Handbook, Editor Allen Tucker, CRC Press, pp. 578–580. 1996.* van den Bos, A. (Bos), "Complex gradient and Hessian", IEE Proceedings–Vision, Image and Signal Processing. pp. 380–382, Dec. 1994.*

Gang et al., "A complete translation and rotation invariant algorithm for pattern recognition", Proceedings 36th Midwest symp. on Circuits and Systems, Aug. 18, 1993.*

Sukanya et al., "A new operator for image structure analysis", Proceedings International Conf. on Image Processing, Sep. 19, 1969.*

Noumeir, R. Et al., "Use of an optical flow algorithm to quantify and correct patient motion during tomographic acquisition", Proceedings International Conference on Image Processing, 1996, vol. 3. Sep. 19, 1996.*

Wu, "A Correlation–relaxation–labeling framework for computing optical flow–template matching from a new perspective", IEEE Transactions on Pattern Analysis and Machine Intelligence, vol. 17, issue 9, Sep. 1995.*

Russ, The Image Processing Handbook 2nd Edition, CRC Press, p. 155–156, 1994.*

(List continued on next page.)

*Primary Examiner*—Amelia M. Au
*Assistant Examiner*—Martin Miller
(74) *Attorney, Agent, or Firm*—Donald B. Paschburg

(57) ABSTRACT

A method for localization refinement of inspection patterns comprises the steps of providing a template image comprising pixels in a pattern, each pixel having an intensity, providing an input image having a same pattern of pixels as the template image and calculating an energy function by weighting a sum of modified optical flow constraints at locations of the pixels of both the template image and the input image to determine a shift and rotation between the pattern of the template image and the input image.

11 Claims, 4 Drawing Sheets

OTHER PUBLICATIONS

Little et al., (Little), "Analysis of differential and matching methods for optical low", Proceedings of workshop on Visual Motion, ISBN: 0-8186-1903-1, Mar. 1989.*

Lai et al., (Lai), "Robust and efficient algorithms for optical flow computation", Proceedings of International Symposium on Computer Vision, ISBN: 0-8186-7190-4, Nov. 23, 1995.*

Yuille, A. L. et al., "Feature extraction from faces using deformable templates", Proceedings CVPR '89, IEEE Computer Society Conference on Computer Vision and Pattern Recognition, 1989, ISBN: 0-8186-1952-x, Mar. 1989.*

Snyder, M.A., On the mathematical foundations of smoothness constraints for the determination of optical flow and for surface reconstruction, IEEE Transactions on Pattern Analysis and Machine Intelligence, vol. 13, Issue 11, Nov. 1991.*

* cited by examiner

METHOD OF LOCALIZATION REFINEMENT OF PATTERN IMAGES USING OPTICAL FLOW CONSTRAINTS

FIELD OF THE INVENTION

This disclosure relates to a method for optical inspection and, more particularly, to a method of refinement of localization of patterns based on optical flow constraints.

DESCRIPTION OF THE RELATED ART

Automatic visual inspection of parts for defect detection in manufacturing processes is one of the most important applications in machine vision. The performance of an automatic visual inspection system can be determined by its reliability, efficiency and generality. The inspection system needs to be reliable under different illumination conditions and in noisy environments. The reliability of the inspection system, which is usually characterized by its false alarm rate, is very crucial to the quality control in a manufacturing process.

The efficiency of an automatic inspection system is directly related to the throughput of the product. In addition, automatic inspection systems may perform different kinds of inspection tasks.

A number of methods have been proposed for automatic visual inspection. They can be roughly categorized into two approaches namely, the image reference approach and the design-rule verification approach. The image reference or image subtraction approach compares every pixel in the inspection image with the corresponding pixel in the reference image, which is a sensed defect-free image or a synthetically generated image from a CAD model. The design-rule verification approach checks for the violation of a set of generic rules, such as design width and spacing standards, in the image. The image reference approach is very popular in automatic visual inspection due to its general applicability to a variety of inspection tasks. However, it requires very precise alignment of the inspection pattern in the image. Although the design-rule verification approach does not need very accurate alignment, it usually requires complicated algorithm design for each individual inspection task. In addition, the design-rule verification approach is in general less reliable than the image reference approach.

Visual inspection processes are often used to provide a check on the quality of products. A faster and more reliable method is advantageous for automated visual inspection processes. Therefore, a fast and precise pattern alignment algorithm, which can be used in the image reference approach for automated visual inspection is desirable. To achieve very precise pattern alignment, exhaustive template search is extremely time consuming when the size of the pattern is large. Some methods have been proposed to resolve this alignment problem.

In one proposal, an image registration technique is performed by fitting feature points in the zero-crossings extracted from the image to be inspected to the corresponding points extracted from the CAD model via an affine transformation. Unfortunately, the correspondence between the two set of feature usually cannot be reliably obtained. Another proposal employed a sum-of-squared-differences (SSD) method to determine the shift between the two images. In addition to its restriction on the recovery of shift alignment only, this method could not handle illumination changes between the image to be inspected and the reference image.

Localization refinement includes the ability to determine between defects in an inspection pattern or the misalignment of the pattern. In an inferior system misaligned patterns are rejected by the inspection system resulting in undue costs.

Therefore, a need exists for an accurate, efficient and robust method for determining precise 2D localization of an inspection pattern for applications in automated visual inspection.

SUMMARY OF THE INVENTION

A method for localization refinement of inspection patterns includes the steps of providing a template image comprising pixels in a pattern, each pixel having an intensity, providing an input image having a same pattern of pixels as the template image and minimizing an energy function formed by weighting a sum of modified optical flow constraints at locations of the pixels of both the template image and the input image to determine a shift and rotation between the pattern of the template image and the input image.

In other methods, the steps may include partitioning the template image into blocks of pixels, determining a reliability measure for each pixel in each block and identifying the pixel location for each block having a largest reliability measure as the feature point for each block.

The steps of providing an input image with an initial shift and rotation to the template image and minimizing the energy function formed by weighting the sum of modified optical flow constraints at locations of the feature points of the template image to determine the shift and rotation between the template image and the input image may also be included. The step of minimizing an energy function formed by weighting a sum of modified optical flow constraints may further include the steps of calculating a Hessian matrix and a gradient vector of the energy function based on an initial guess of a shift and a rotation, updating the initial guess based on the calculating of the Hessian matrix and the gradient vector of the energy function and iteratively recalculating the Hessian matrix and the gradient vector of the energy function until an updated guess is within an acceptable increment from a previous updated guess. The step of smoothing the template image to reduce noise effects may also be included. The step of minimizing an energy function formed by weighting a sum of modified optical flow constraints may further include the step of incorporating an illumination change factor into the optical flow constraints for accounting for pixel intensity changes due to illumination effects.

A method for localization refinement of inspection patterns the steps of determining features points on a template image from among blocks of pixels, providing an input image with an initial shift and rotation to the template image and minimizing an energy function formed by weighting a sum of modified optical flow constraints at locations of the feature points of the template image to determine a shift and rotation between the template image and the input image.

In other methods, the step of determining feature points may include partitioning the template image into blocks of pixels, determining a reliability measure for each pixel in each block and identifying the pixel location for each block having a largest reliability measure as the feature point for each block. The step of minimizing an energy function formed by weighting a sum of modified optical flow constraints at locations of the feature points further includes the steps of calculating a Hessian matrix and a gradient vector of the energy function based on an initial guess of a shift and a rotation, updating the initial guess based on the calculating the Hessian matrix and the gradient vector of the energy function and iteratively recalculating the Hessian matrix and the gradient vector of the energy function until an updated guess is within an acceptable increment from a previous updated guess. The step of smoothing the template image to reduce noise effects may also be included. The step of minimizing an energy function formed by weighting a sum of modified optical flow constraints at locations of the feature points may further include the step of incorporating an illumination change factor into the optical flow constraints for accounting for pixel intensity changes due to illumination effects.

A method for computer inspection for determining misalignment between inspection patterns includes the steps of providing a template image comprising blocks of pixels, determining features points on the template image from among blocks of pixels by selecting a pixel location in each block having a largest reliability measure, averaging pixels in an area surrounding each feature point to reduce noise in the template image, providing an input image with an initial shift and rotation guess to the template image, minimizing an energy function formed by weighting a sum of modified optical flow constraints at locations of the feature points of the template image to determine a shift and rotation between the template image and the input image. The step of minimizing an energy function formed by weighting a sum of modified optical flow constraints at locations of the feature points may further include the steps of calculating a Hessian matrix and a gradient vector of the energy function based on an initial guess of a shift and a rotation, updating the initial guess based on the calculating the Hessian matrix and the gradient vector of the energy function and iteratively recalculating the Hessian matrix and the gradient vector of the energy function until an updated guess is within an acceptable increment from a previous updated guess. The step of minimizing an energy function formed by weighting a sum of modified optical flow constraints at locations of the feature points may further include the step of incorporating an illumination change factor into the optical flow constraints for accounting for pixel intensity changes due to illumination effects.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1A:
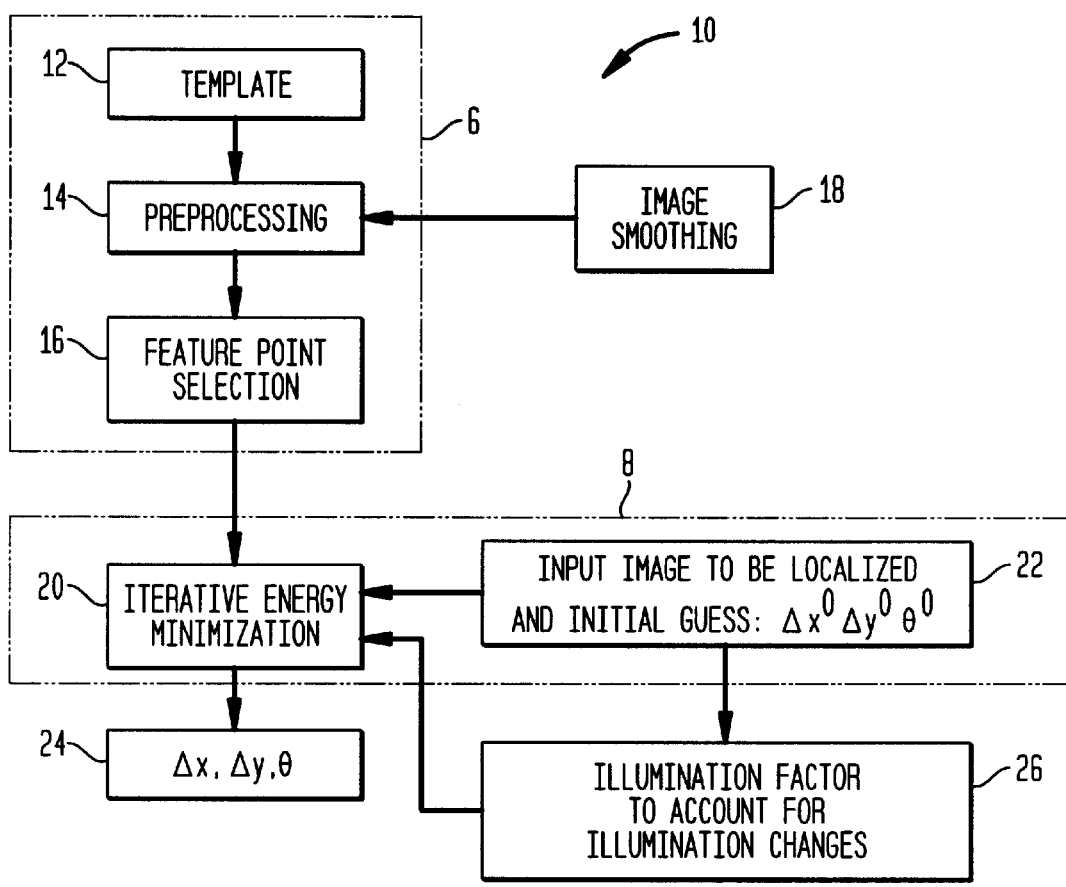
FIG. 1A is a flow chart of a localization refinement method in accordance with the present invention.

The present disclosure describes a method for comparing images. The disclosure provides a method for inspecting objects based on a least squares fitting of modified optical flow constraints. No feature correspondence is required in the disclosed method. In addition, the method is robust against noise and uniform illumination changes, since the modified optical flow constraint accounts for the illumination changes. Although this method was originally developed for the inspection using gray-level images, it can be extended to the inspection using color images or range images.

2D localization is focused on the determination of the position of a pattern and an associated orientation angle from an input image. Other global transformation models, such as affine transformations, may be employed in the same framework of the present disclosure. A rough solution to this localization problem may be obtained by using some conventional methods, such as applying a template matching technique in a coarse resolution. The template is a predefined standard against which an input image is compared. The method obtains a precise localization of the pattern for a given rough initial localization.

The pattern localization finds the best 2D rigid transformation between the template and the initially located region in the input image. Since a rough initial localization is available, the 2D rigid transformation may be assumed to comprise a small translation vector and a small rotation. For small displacements between images, an optical flow constraint may be derived from a first-order Taylor series approximation of a brightness constancy assumption.

A modified optical flow constraint is derived herein by using a generalized brightness assumption and replacing displacement vectors by the 2D rigid transformation parameters. Based on the consideration of efficiency as well as reliability, a feature point selection method is used to choose a set of locations with reliable modified optical flow constraints. The method is primarily based on an iterative energy minimization formulation with an energy function being a weighted sum of modified optical flow constraints at selected locations. The method handles large degrees of illumination changes by explicitly incorporating an illumination change factor into the modified optical flow constraint. The minimization of the energy function is accomplished via an efficient iterative algorithm, which has proved to be very reliable for small localization refinement from experiments described herein, namely for position errors within 5 pixels and rotation angles within 5 degrees. The minimization process is basically a very efficient search of the best transformation, i.e. shift and rotation, for general template matching.

A gradient-based approach has been very popular for optical flow computation in computer vision. It is primarily based on the following image flow constraint equation:

$$I_x(x, y, t)u(x, y)+I_y(x, y, t)v(x, y)+I_t(x, y, t)=0,$$

where $I(x, y, t)$ is the intensity function at location$(x, y)$ and at time t, and $(u, v)$ is the flow vector at the same location and the same time. This equation can be derived from the brightness constancy assumption, $I_x(x+u\Delta t, y+v\Delta t, t+\Delta t)=I(x, y, t)$, by using the first-order Taylor series approximation. A localization refinement problem focused on herein can be regarded as a small motion between a template and an initially located region in an input image. Thus, the optical flow approach may be applied to recover the small shift and rotation.

Let the function $I_0(x, y)$ denote the template image and $I_1(x, y)$ be a located region in the input image, then the brightness constancy assumption can be rewritten as $I_1(x+u, y+v)=I_0(x, y)$. However, this assumption may not hold when an illumination changes. This assumption can be generalized by incorporating an illumination factor as follows:

$$I_0(x+u, y+v)=a\ I_1(x, y)+b$$

where a is a multiplication factor and b is an offset constant to model the illumination change. This generalization of the brightness constancy assumption allows for homogeneous illumination changes by modeling the intensity changes using a first-order polynomial, for example. By assuming the displacement vector (u, v) is small, the first-order Taylor series approximation of the above generalized brightness assumption may be taken. Note that this assumption is valid for a small shift and rotation case, which is true for the localization refinement problem discussed herein. This assumption may be valid in other instances as well. Thus, the following modified optical flow constraint equation may be derived:

$$I_x(x, y)u(x, y)+I_y(x, y)v(x, y)+I_0(x, y)-a\ I_1(x, y)-b=0,$$

where $$I_x(x, y) = \frac{\partial I_0(x, y)}{\partial x} \text{ and } I_y(x, y) = \frac{\partial I_0(x, y)}{\partial y}.$$

Since a 2D rigid transformation is illustrated as an example herein, the displacement vector (u, v) at the location (x, y) may be written as $$\begin{pmatrix} u \\ v \end{pmatrix} = \begin{pmatrix} \cos\theta & -\sin\theta \\ \sin\theta & \cos\theta \end{pmatrix}\begin{pmatrix} x-X_c \\ y-y_c \end{pmatrix} + \begin{pmatrix} x_c + \Delta x_0 \\ y_c + \Delta y_0 \end{pmatrix},$$

where $(\Delta x, \Delta y)$ is the translation vector, $\theta$ is the rotation angle, and $(x_c, y_c)$ is the center of rotation. Due to the fact that there are an infinite number of possible combinations of the translation vector, rotation angle and rotation center for any 2D rigid transformation, the rotation center may be chosen to be the same as the center of the template for convenience, however, any arbitrary location may be consistently chosen without loss of generality. Using the relationship between the displacement vector (u, v), the translation vector $(\Delta x, \Delta y)$ and rotation angle $\theta$, the modified optical flow constraint equation can be rewritten as follows:

$$I_x(x, y)\Delta x+I_y(x, y)\Delta y+f(x, y)\cos\theta+g(x, y)\sin\theta+I_0(x, y)-a\ I_1(x, y)-b=0,$$

where $$f(x, y)=I_x(x\ y)(x-x_c)+I_y(x, y)(y-y_c),$$

$$g(x, y)=-I_x(x, Y)(y-y_c)+I_y(x, y)(x-x_c).$$

This modified optical flow constraint equation becomes a constraint on transformation parameters, i.e. the translation vector $(\Delta x, \Delta y)$ and rotation angle $\theta$, at a location (x, y). By summing all the modified optical flow constraints at different locations $(x_i, y_i)$ for I =1, ... n, an energy function may be defined as follows:

$$E(\Delta x, \Delta y, \theta, a, b) = \sum_{i=1}^{n} w_i(I_{x,i}\Delta x + I_{y,i}\Delta y + f_i\cos\theta + g_i\sin\theta + I_0(x_i, y_i) - aI_1(x_i, y_i) - b)^2.$$

where $I_{x,i}=I_x(x_i, y_i)$, $I_{y,i}=I_y(x_i, y_i)$, $f_i=f(x_i, y_i)$, $g_i=g(x_i, y_i)$ and $w_i$ is the weight associated to each constraint. The weight, $w_i$, is set for the constraint at location (x, y) to be the reciprocal of the quantity $$\sqrt{(x-x_c)^2+(y-y_c)^2+\delta},$$

where $\delta$ is a positive constant used to prevent over-weighting of the constraints at the locations very close to $(x_c, y_c)$. This constant $\delta$ is set to a predetermined number, for example 10. The quantity of 10 in this case is an approximate Euclidean distance from a point to the rotation center $(x_c, y_c)$. The reason for this choice of weighting is that displacement vectors for the locations far away from the rotation center can be very large even for a small rotation angle, thereby leading to larger errors in the constraints than those located close to the rotation center. Thus, the localization refinement problem can be formulated as the following energy minimization problem:

$$\min_{(\Delta x, \Delta y, \theta, a, b)} E(\Delta x, \Delta y, \theta, a, b)$$

This is may be formulated as a nonlinear optimization problem involving five variables. Since a good initial guess can be obtained for a small shift and rotation case, a Newton method may be used to solve this optimization problem very efficiently.

The energy minimization formulation may be further refined by putting the formulation into an iterative minimization framework as follows. In the energy function E ($\Delta x, \Delta y, \theta, a, b$), each modified optical flow constraint is obtained at the same location for the intensity functions $I_0$ and $I_1$. This is based on the assumption that the motion between these two images is small. However, this assumption can be generalized to the case of large motion and with a good initial guess. For this generalization, $I_1(x_i, y_i)$ is replaced by the same function $I_1$ at the transformed location with the transformation parameters given by the initial guess, i.e.

$$I_1(T_x(x_i, y_i; \Delta x^{(o)}, \Delta y^{(o)}, \theta^{(o)}), T_y(x_i, y_i; \Delta x^{(o)}, \Delta y^{(o)}, \theta^{(o)})),$$

where $$T_x(x_i, y_i; \Delta x^{(o)}, \Delta y^{(o)}, \theta^{(o)}), \text{ and } T_y(x_i, y_i; \Delta x^{(o)}, \Delta y^{(o)}, \theta^{(o)})$$

are the transformed coordinate in the x and y directions, respectively, and $(\Delta x^{(o)}, \Delta y^{(o)}, \theta^{(o)})$ is the initial guess of the 2D rigid transformation. Thus, a new energy function E'($\Delta x, \Delta y, \theta, a, b, \Delta x', \Delta y', \theta'$) may be defined as:

$$E'(\Delta x, \Delta y, \theta, a, b; \Delta x', \Delta y', \theta' = \sum_{i=1}^{n} w_i(I_{x,i}\Delta x + I_{y,i}\Delta y + f_i\cos\theta + g_i\sin\theta + I_0(x_i, y_i) - aI_1(T(x_i, y_i; \Delta x', \Delta y', \theta')) - b)^2$$

where

-continued $$T(x_i, y_i; \Delta x', \Delta y', \theta') = (T_x(x_i, y_i; \Delta x', \Delta y', \theta'),$$
$$(T_y(x_i, y_i; \Delta x', \Delta y', \theta')).$$

Similarly, this new energy function may be used for the currently updated estimate of the transformation parameters to derive an iterative energy minimization method. The update of the transformation parameters is accomplished by combining the current transformation setting ($\Delta x'$, $\Delta y'$, $\theta'$) applied on $I_1$, with the additional transformation parameters applied on $I_1$, and obtained from the minimization of the new energy function. To be more specific, the transformation for $I_0$ and $I_1$, are denoted by $T_0$ and $T_1$ respectively and the underlining constraint is $I_0(T_0(x, y))=aI_1(T_1(x, y))+b$, where $$T_0(x, y) = R(\theta_0)\begin{pmatrix} x - x_c \\ y - y_c \end{pmatrix} + \begin{pmatrix} x_c + \Delta x_0 \\ y_c + \Delta y_0 \end{pmatrix},$$

$$T_1(x, y) = R(\theta_1)\begin{pmatrix} x - X_c \\ y - y_c \end{pmatrix} + \begin{pmatrix} x_c + \Delta x_1 \\ y_c + \Delta y_1 \end{pmatrix},$$

where $R(\theta)$ is the rotation matrix with angle $\theta$. To convert the above constraint into the form $I_0(u, v)=aI_1(T_1'(u\ v))+b$, a new transformation is obtained, i.e. $T_1'=T_1/T_0$, i.e.

$$T_l'(u, v) - T_1(T_0^{-1}(u, v)) = T_l\left(R(\theta_0)^{-l}\begin{pmatrix} u - x_c - \Delta x_0 \\ v - y_c - \Delta y_0 \end{pmatrix} + \begin{pmatrix} x_c \\ y_c \end{pmatrix}\right)$$

$$= R(\theta_l)R(-\theta_0)\begin{pmatrix} u - x_c - \Delta x_0 \\ v - y_c - \Delta y_0 \end{pmatrix} +$$

$$\begin{pmatrix} x_c + \Delta x_l \\ y_c + \Delta y_l \end{pmatrix}$$

$$= R(\theta_l - \theta_0)\begin{pmatrix} u - x_c \\ v - y_c \end{pmatrix} + \begin{pmatrix} x_c & \Delta x_l \\ y_c + \Delta y_l \end{pmatrix} -$$

$$R(\theta_l - \theta_0)\begin{pmatrix} \Delta x_0 \\ \Delta y_0 \end{pmatrix}$$

From the above derivation, the new transformation includes a rotation of angle $\theta_1 - \theta_0$ around the center $$\begin{pmatrix} x_c \\ y_c \end{pmatrix}$$

and a translation vector $$\begin{pmatrix} \Delta x_1 \\ \Delta y_1 \end{pmatrix} - R(\theta_1 - \theta_0)\begin{pmatrix} \Delta x_0 \\ \Delta y_0 \end{pmatrix}.$$

This leads to the following iterative energy minimization formulation.

k=0

Repeat until converged $$\min_{(\Delta x, \Delta y, \theta, a, b)} E'(\Delta x, \Delta y, \theta, a, b; \Delta x^k, \Delta y^k, \theta^k)$$

$$\theta^{(k+1)} = \theta^{(k)} - \theta,$$

$$\begin{pmatrix} \Delta x^{(k+1)} \\ \Delta Y^{(k+1)} \end{pmatrix} = \begin{pmatrix} \Delta x^{(k+1)} \\ \Delta y^{(k+1)} \end{pmatrix} - R(\theta^{k+1})\begin{pmatrix} \Delta x \\ \Delta y \end{pmatrix}$$

return

The convergence criterion is simply the requirement that the magnitude of the new additional estimate ($\Delta x$, $\Delta y$, $\theta$) is smaller than a threshold (a small positive value). This iterative minimization formulation leads to improved accuracy of estimation results. In addition, the minimization provides the possibility to extend this algorithm to the estimation of large shift and rotation.

The solution to the above iterative minimization is an efficient way to minimize the sum of squared generalized brightness constraints with the displacement vector replaced by the translation vector ($\Delta x$, $\Delta y$) and the rotation angle $\theta$, i.e. $I_0(x_i, y_i)-aI_1(T_x(x_i, y_i; \Delta x, \Delta y, \theta), T_y((x_i, y_i; \Delta x, \Delta y, \theta))-b$. One advantage of using the above iterative minimization formulation instead of minimizing the sum of squared generalized brightness constraints directly reduces the computation involved in the numerical minimization process. The update of a Hessian matrix and the gradient vector is greatly simplified using the above iterative energy minimization formulation.

The shift and rotation recovery between two images is formulated as an iterative energy minimization problem. The energy function is the weighted sum of the modified optical flow constraints at different locations. Alternately, the sum over all of the pixels in the template may be taken. However, this may cause very high computational cost for large templates. In addition, it is more important to use a smaller number of reliable constraints than to use a large number of unreliable constraints. Using a very large number of constraints, especially for the present illustrative optimization problem of only five variables, is not advantageous. Therefore, feature points for the locations of the constraints are selected and used in the energy function to increase efficiency as well as reliability.

In feature point selection, a first partition is created dividing the template image into m×n uniform blocks such that the total number of blocks is about 400. Although 400 constraints are suggested depending on the results desired this number may be modified. 400 constraints are quite sufficient for the illustrative example to provide an accurate shift and rotation estimation. An appropriate point is selected which can provide a reliable constraint in each block. This point is called the feature point. The energy function is formed from the weighted sum of the modified optical flow constraints at these feature points. This method provides a uniform distribution of the selected feature points in the template image. The feature point selection in each block is described herein.

Both the optical flow constraint and the modified optical flow constraint are derived from the first-order Taylor series approximations of the brightness constancy assumption and generalized brightness assumption, respectively. For both cases, numerical differentiation is required to approximate the partial derivatives in the constraints. Approximation errors in the partial derivatives are inevitable due to inaccurate numerical approximation as well as the temporal and spatial aliasing in the brightness function. These approximation errors are the main source of errors in the optical flow constraint equations. Since linear numerical approximation methods are usually used for the partial derivatives, the feature point selection is primarily determined by comparing the degree of local linearity for all the locations in each block. In the following, a reliability measure σ(x, y) of using the modified optical flow constraint at location (x, y). A first-order polynomial function αx+βy+γ may be fit to the intensity function $I_0$ in a (2k+1)x(2k+1) neighborhood of location (x, y), where k may be set to an integer, for example 1. Then, a sum of squared linear approximation errors sse (x, y) is given by $$sse(x, y) = \sum_{j=-k}^{k} \sum_{i=-k}^{k} (I_0(x+i, y+j) - (\alpha i + \beta j + \gamma))^2$$

This gives a sum-of-squared-differences error, which is a measure of absolute distance between points within each block. Since it is more reasonable to use a measure of minimum distance, the sum of squared linear approximation errors sse(x, y) is normalized by using the magnitude of the gradient of the linear function αx+βy+γ to obtain a measure of minimum distance, i.e. sse(x, y)/(α²+β²). A reliability measure σ(x, y) of using the modified optical flow constraint at location (x, y) may be defined as follows:

$$\sigma(x, y) = \frac{\alpha^2(x, y) + \beta^2(x, y)}{sse(x, y) + \varepsilon}$$

where α(x, y) and β(x, y) are the coefficients of the first-order polynomial fitting described above at location (x, y), and e is a small positive to prevent over-amplification of very small values of sse(x, y) to the reliability measure. e may be set to 10, for example. Thus, the selection of a feature point finds the location with the largest reliability measure in each block.

The energy function to be minimized in each iteration of the iterative energy minimization formulation was defined above. Based on the fact that the energy function is a nonlinear least square minimization problem of only five unknowns (variables) and a good initial guess is usually available, the Newton method may be employed to solve this minimization problem very efficiently. The Newton method for the minimization of the energy function E'(Δx, Δy, θ, a, b; Δx', Δy') is based on the following updated equation:

$$\begin{pmatrix} \Delta \hat{x}^{(i+1)} \\ \Delta \hat{y}^{(i+1)} \\ \hat{\theta}^{(i+1)} \\ \hat{a}^{(i+1)} \\ \hat{b}^{(i+1)} \end{pmatrix} = \begin{pmatrix} \Delta \hat{x}^{(i)} \\ \Delta \hat{y}^{(i)} \\ \hat{\theta}^{(i)} \\ \hat{a}^{(i)} \\ \hat{b}^{(i)} \end{pmatrix} - H^{(i)-1} g^{(i)},$$

where i is the iteration index, $H^{(i)}$ and $g^{(i)}$ are the Hessian matrix and gradient vector, respectively, of the energy function E'(Δx, Δy, θ, a, b; Δx', Δy', θ) at the estimate computed from the i-th iteration. To be more specific, the Hessian matrix H and the gradient vector g for the energy function E'(Δx, Δy, θ, a, b; Δx', Δy', θ) are given as follows:

$$H = 2\sum_{i=1}^{n} w_i \begin{pmatrix} I_{x,i}^2 & I_{x,i}I_{y,i} & I_{x,i}p_i(\theta) & I_{x,i}I_{1,i} & I_{x,i} \\ I_{x,i}I_{y,i} & I_{y,i}^2 & I_{y,i}p_i(\theta) & I_{y,i}I_{1,i} & I_{y,i} \\ I_{x,i}p_i(\theta) & I_{y,i}p_i(\theta) & p_i(\theta)h_i(\Delta x, \Delta y, \theta, a, b) & p_i(\theta)I_{1,i} & p_i(\theta) \\ I_{x,i}I_{1,i} & I_{y,i}I_{1,i} & p_i(\theta)I_{1,i} & I_{1,i}^2 & I_{1,i} \\ I_{x,i} & I_{y,i} & p_i(\theta) & I_{1,i} & 1 \end{pmatrix},$$

$$g = 2\sum_{i=1}^{n} w_i \begin{pmatrix} I_{x,i}h_i(\Delta x, \Delta y, \theta, a, b) \\ I_{y,i}h_i(\Delta x, \Delta y, \theta, a, b) \\ p_i(\theta)h_i(\Delta x, \Delta y, \theta, a, b) \\ I_{1,i}h_i(\Delta x, \Delta y, \theta, a, b) \\ h_i(\Delta x, \Delta y, \theta, a, b) \end{pmatrix},$$

where $p_i(\theta) = -f_i \sin \theta + g_i \cos \theta$, $q_i(\theta) = f_i \cos \theta + g_i \sin \theta$, and $h_i(\Delta x, \Delta y, \theta, a, b)$ is $I_{x,i}\Delta x + I_{y,i}\Delta y + f_i \cos \theta + g_i \sin \theta + I_0(x_i, y_i) - aI_1(T(x_i, y_i; \Delta x', \Delta y', \theta')) - b$. The Newton iteration is an inner loop of the iterative energy minimization framework. The shift and rotation recovery algorithm may be recovered by combining a Newton update with an update of the transformation parameters and energy function in the same loop. The resulting iterative numerical algorithm is given as follows:

k=0

Repeat until converged
  compute $H^{(k)}$ and $g^{(k)}$ for E'(Δx, Δy, θ, a, b; $\Delta x^{(k)}$, $\Delta y^{(k)}$, $\theta^{(k)}$) with
  (Δx, Δy, θ, a, b) given by (0, 0, 0, $a^{(k)}$, $b^{(k)}$)

$$\begin{pmatrix} \Delta \hat{x} \\ \Delta \hat{y} \\ \hat{\theta} \\ \hat{a} \\ \hat{b} \end{pmatrix} = H^{(k)-1} g^{(k)},$$

$$\Delta \theta^{(k+1)} = \Delta \theta^{(k)} + \hat{\theta},$$

$$\begin{pmatrix} \Delta x^{(k+1)} \\ \Delta y^{(k+1)} \end{pmatrix} = \begin{pmatrix} (\Delta x^{(k+1)}) \\ \Delta y^{(k+1)} \end{pmatrix} + R(\theta^{(k+1)}) \begin{pmatrix} \Delta \hat{x} \\ \Delta \hat{y} \end{pmatrix},$$

$a^{(k+1)} = a^{(k)} - \hat{a}$, $b^{(k+1)} = b^{(k)} - \hat{b}$, k=k+1, return The convergence criterion may be set to be either that both Δx̂ and Δŷ are within 0.1 pixels and θ̂ is within 0.1 degrees or that the total number of iterations exceeds 30. For most cases, this algorithm may converge in 10 iterations.

Referring now in specific detail to the drawings in which like reference numerals identify similar or identical elements throughout the several views, and initially to FIG. 1, a flow chart 10 of localization refinement steps of the method in accordance with the disclosure of the present invention is illustrated. The implementation of a localization refinement algorithm includes two phases, namely a training phase 6 and execution phase 8. The training phase 6 includes a template object step 12, where a template object is recovered, a preprocessing or smoothing step 14, a feature selection step 16 which includes the computation of the gradients to determine the feature point locations for the template image. The computation involved in this phase is completely related to the template image only, therefore it can be performed in advance of the capture of the input image. Since the templates in many industrial inspection applications were already known prior to starting the localization task, the training phase 6 for these templates can be pre-computed beforehand.

The preprocessing step may include a smoothing step 18 which includes reducing noise in the template image as described herein. Again, the object template is used as a standard against which all inspected input objects or images will be compared. The preprocessing depends on the form in which the object template is in. If a predigitized image is used for the object template, for example, little preprocessing is needed. Preprocessing includes preparing the object template for feature point selection in step 16. This may include a smoothing operation to reduce noise effects on pixels of the template. In step 16, the object template is divided and feature points are determined as described herein. In step 20, an iterative energy minimization is performed with input from step 22. Input from step 22 may include digitally capturing an image (an input image) to be localized for inspection, for example, a metal line on a printed wiring board to be compared against the object template. Step 22 may include using a camera and/or a video card installed in a computer to digitally capture an input image for the object to be inspected. Other forms of equipment include microscopes, monitors, etc. Step 22 inputs an initial guess ($\Delta x^{(o)}$, $\Delta y^{(o)}$, $\theta^{(o)}$) to the energy minimization in step 20 as described above. An additional input which may be included in from block 26 is an illumination factor or factors to account for illumination effects in the images.

The execution phase 8 is basically an iterative energy minimization process step 20 to estimate the shift and rotation angle difference between an input image from step 22 and the template image. The shift and rotation angle difference are outputted in step 24. The total time required in the execution phase 8 of the algorithm is independent of the size of the image. It depends on the number of feature points and the number of iterations required in the energy minimization process. In our experiments, the execution phase takes about 20~30 msec on a multi-user SUN SPARC-20 workstation, depending on the number of iterations required to achieve the convergence in the energy minimization process.

Figure 1B:
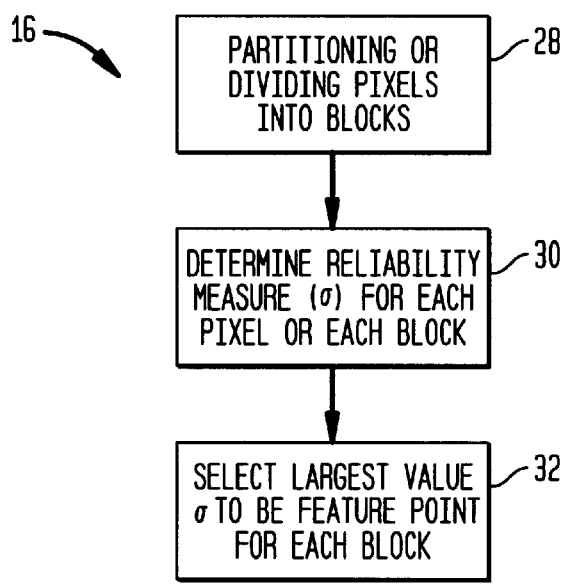
FIG. 1B is a flow chart showing steps for selecting feature points for the localization refinement method of FIG. 1A.

Referring to FIG. 1B, step 16 of FIG. 1A may include substeps for selecting feature points. If feature points are included in the method, partitioning or dividing pixels into blocks may be included in step 28. For example, a template may be partitioned into 20×20 blocks. A reliability measure σ is calculated for each pixel in each block as described above in step 30. In step 32, feature points are selected for each block by choosing the pixel with the largest reliability measure for that block.

Figure 1C:
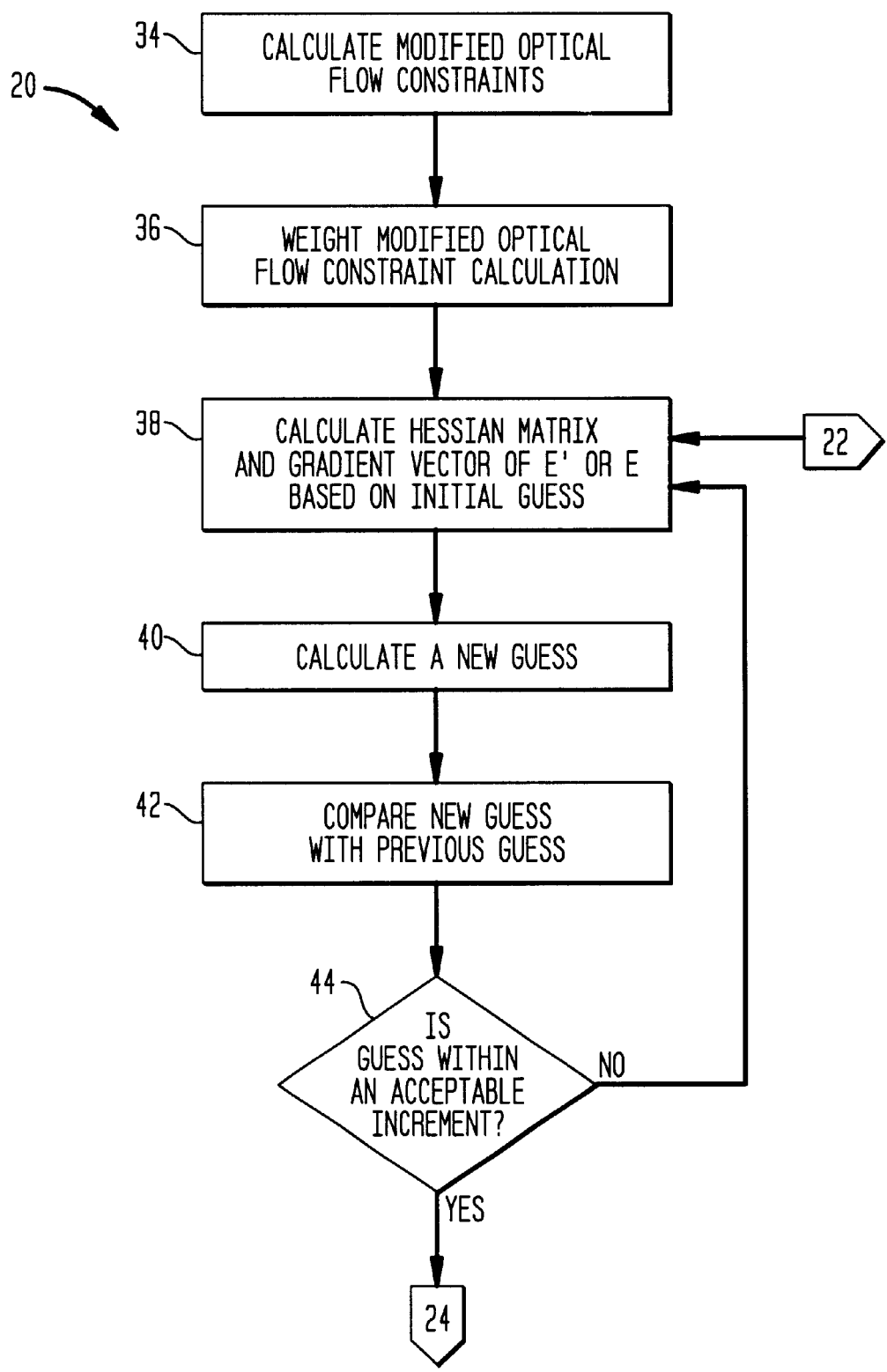
FIG. 1C is a flow chart showing steps for calculating minimum energy to determine shift and rotation between a template and an input image for the localization refinement method of FIG. 1A.

Referring to FIG. 1C, step 20 of FIG. 1A may include substeps for calculating the Hessian matrix and the gradient vector of the energy function (E or E'). Details of these steps are described above. In step 34, modified optical constraints are calculated for each pixel or each feature point. In step 36, the modified optical flow constraints are weighted. The Hessian matrix and the gradient vector of E or E' is calculated in step 38 based on an initial guess ($\Delta x^{(o)}$, $\Delta y^{(o)}$, $\theta^{(o)}$) from step 22. A new guess is calculated using the Newton method, for example, in step 40. In steps 42 and 44, the new guess is compared to the previous guess to determine if an acceptable increment has been achieved, for example, the changes in the x- and y- shifts are within about 0.1 pixels and the change in the rotation angle is within about 0.1 degrees. If the guess is within the acceptable increment, ($\Delta x$, $\Delta y$, $\theta$) are outputted in step 24 (FIG. 1A). If the guess is not within the acceptable increment, steps 38, 40, 42 and 44 are repeated.

The method represented of the present invention has been tested on many real images for industrial inspection. It provides very accurate localization results within a very short period of execution time. Simulation results are presented on some real images to demonstrate the accuracy and robustness of the method.

Figure 2A:
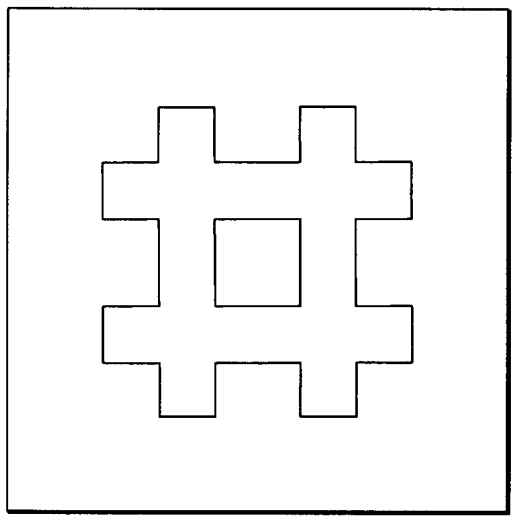
FIG. 2A is a photographic image of an inspection pattern.
Figure 2B:
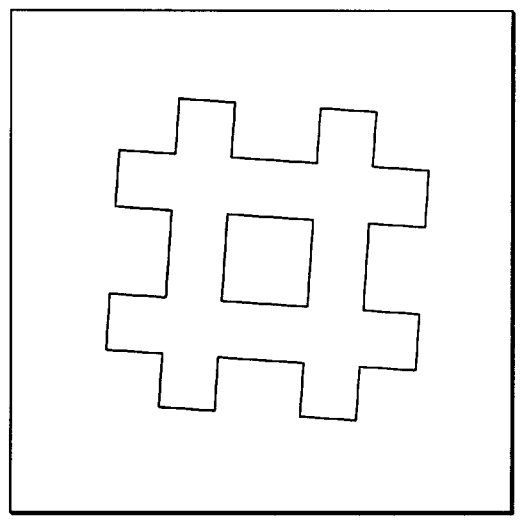
FIG. 2B is a photographic image of the inspection pattern of FIG. 2A simulating an input image rotated and shifted and having noise.
Figure 2C:
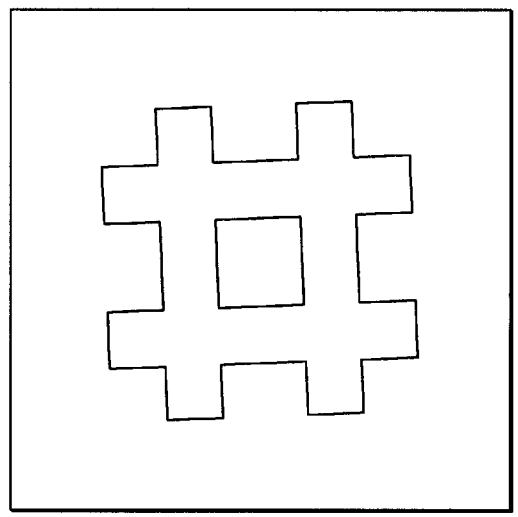
FIG. 2C is a photographic image of the inspection pattern of FIG. 2A simulating an input image rotated and shifted and having noise.

Referring to FIGS. 2A, an illustrative inspection pattern is shown for a "pound sign". In FIGS. 2B and 2C, transformations were randomly generated (including shifts and rotations) for each template with the shifts in the x and y directions randomly selected from a uniform distribution ranging from −5 to 5 pixels and the rotation angles drawn from a uniform distribution between −5 to 5 degrees. Global illumination changes were simulated by randomly drawing samples for the coefficients a and b in the illumination change model from the uniform distributions of the ranges [0.75, 1.25] and [30, −30]. To simulate a noise effect, a random is multiplicative noise was imposed to each pixel with each multiplication factor randomly selected from two different uniform distributions in the ranges between −10% to 10% of multiplicative noise (FIG. 2B), and −20% to 20% of multiplicative noise (FIG. 2C), to show the accuracy of the estimation under different levels of noises. After the above simulation processes, the intensity values were rounded to the closest integer values between 0 and 255.

To alleviate the noise effect, a simple smoothing operation may be performed on the template image simply by averaging in a 3×3 window, for example. Then, the iterative energy minimization method is applied to estimate the shift and rotation. In one example, with the convergence criterion that the changes in the x- and y- shifts are within 0.1 pixels and the change in the rotation angle is within 0.1 degrees, the minimization usually converges in about 10 iterations.

Statistics may be computed for estimation errors after running experiments for three different levels of random noise as described above. In the images of FIGS. 2A–C, 100 experiments were performed for the three noise levels. The localization algorithm was applied in the experiments using the inspection pattern shown in FIGS. 2A–C. The statistics of the estimation errors for the random multiplicative noises within 10 percent is shown in Table 1. This result is very accurate for the images under the level of noise applied to the image. Table 2 gives the statistics of the estimation accuracy when the level of the random multiplicative noises increases to within 20 percent, respectively. From the results, it is apparent that very precise localization is provided even when the image contains a high-level of noise.

TABLE 1

|  | Mean | Standard Deviation |
| --- | --- | --- |
| Errors in $\Delta x$ | −0.014 pixels | 0.035 pixels |
| Errors in $\Delta y$ | −0.015 pixels | 0.047 pixels |
| Errors in $\theta$ | −0.006 degrees | 0.019 degrees |

TABLE 2

|  | Mean | Standard Deviation |
| --- | --- | --- |
| Errors in $\Delta x$ | −0.016 pixels | 0.057 pixels |
| Errors in $\Delta y$ | −0.016 pixels | 0.065 pixels |
| Errors in $\theta$ | −0.008 degrees | 0.028 degrees |

Figure 3A:
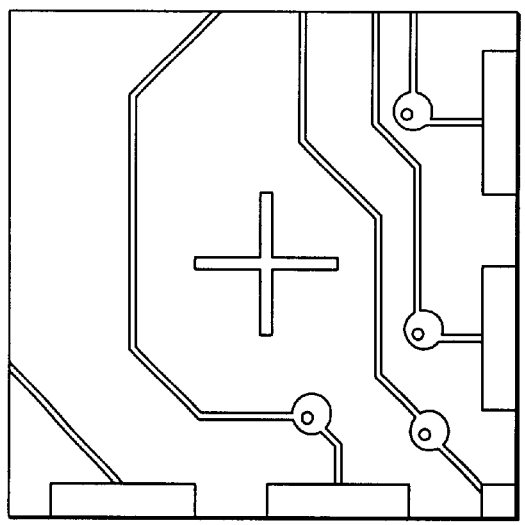
FIG. 3A is a photographic image of an inspection pattern.
Figure 3B:
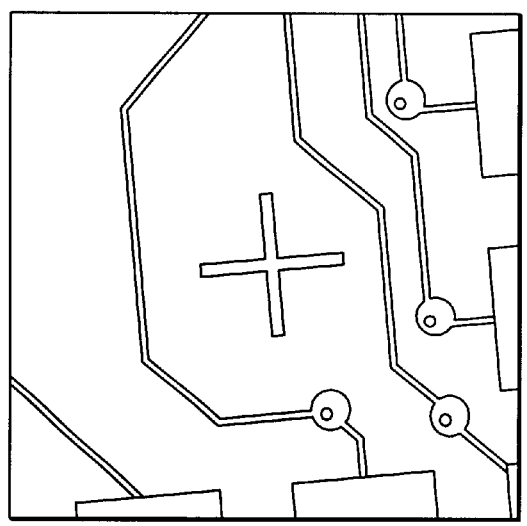
FIG. 3B is a photographic image of the inspection pattern of FIG. 3A simulating an input image rotated and shifted and having noise.
Figure 3C:
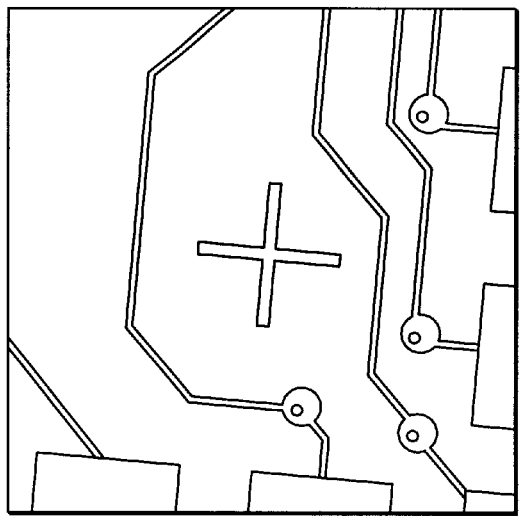
FIG. 3C is a photographic image of the inspection pattern of FIG. 3A simulating an input image rotated and shifted and having noise.

Referring to FIGS. 3A–C, the localization method shown in FIG. 1 is applied to another inspection pattern. The inspection pattern is a portion of a printed wiring circuit board. Metal lines and solder points are shown. In the images of FIGS. 3A–C, 100 experiments were performed for the three noise levels. The localization algorithm was applied in the experiments using the inspection pattern shown in FIGS. 3A–C. The statistics of the estimation errors for the random multiplicative noises within 10 and 20 percent are shown in Tables 3 and 4, respectively. The results show a high accuracy image in the presence of high levels of noise.

TABLE 3

|  | Mean | Standard Deviation |
| --- | --- | --- |
| Errors in $\Delta x$ | −0.026 pixels | 0.035 pixels |
| Errors in $\Delta y$ | −0.003 pixels | 0.016 pixels |
| Errors in $\theta$ | −0.002 degrees | 0.013 degrees |

TABLE 4

|  | Mean | Standard Deviation |
| --- | --- | --- |
| Errors in $\Delta x$ | −0.027 pixels | 0.042 pixels |
| Errors in $\Delta y$ | −0.010 pixels | 0.030 pixels |
| Errors in $\theta$ | −0.004 degrees | 0.015 degrees |

An accurate, efficient and robust method for the pattern localization in automated visual inspection is provided. To overcome the effect of global illumination changes, the modified optical flow constraint, which is derived from the first-order Taylor series approximation of the generalized brightness assumption and the substitution of the displacement vector by the 2D rigid transformation parameters is used. A feature points selection is included for selecting a set of locations of reliable modified optical flow constraints based on the consideration of efficiency and reliability. The method is primarily based on the iterative energy minimization formulation with the energy function being a weighted sum of modified optical flow constraints at selected locations. The minimization of the energy function is accomplished via an efficient iterative method, which is very reliable for precise localization problems. The accuracy, efficiency and robustness of the method is demonstrated through the experimental results on some real images and the corresponding simulated images.

Having described preferred embodiments of a novel method for localization refinement for pattern images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for localization refinement of inspection patterns comprising the steps of:

providing a template image comprising pixels in a pattern, each pixel having an intensity; partitioning the template image into blocks of pixels;

determining a reliability measure for each pixel in each block, the reliability measure being based upon a sum of the squares error and a polynomial fitting function for the pixels in the block;

identifying a pixel location for each block having a largest reliability measure as a feature point for each block;

providing an input image having a same pattern of pixels as the template image, the input image having an initial shift and rotation relative to the template image;

modifying optical flow constraint equations to account for illumination changes in the input image; and minimizing an energy function formed by weighting a sum of the modified optical flow constraints at locations of the pixels of both the template image and the input image to determine a shift and rotation between the pattern of the template image and the input image for determining misalignments between the template image and the input image for an inspection process the minimizing step being performed at locations of the feature points of the template image to determine the shift and rotation between the template image and the input image.

2. The method as recited in claim 1, wherein the step of minimizing an energy function formed by weighting a sum of the modified optical flow constraints further comprises the steps of:

calculating a Hessian matrix and a gradient vector of the energy function based on an initial guess of a shift and a rotation;

updating the initial guess based on the calculating of the Hessian matrix and the gradient vector of the energy function; and iteratively recalculating the Hessian matrix and the gradient vector of the energy function until an updated guess is within an acceptable increment from a previous updated guess.

3. The method as recited in claim 1, further comprising the step of smoothing the template image to reduce noise effects.

4. The method as recited in claim 1, wherein the step of modifying optical flow constraint equations further comprises the step of:

incorporating an illumination change factor into the optical flow constraints for accounting for pixel intensity changes due to illumination effects.

5. A method for localization refinement of inspection patterns comprising the steps of:

determining features points on a template image from among blocks of pixels by:

partitioning the template image into blocks of pixels;

determining a reliability measure for each pixel in each block, the reliability measure being based upon a sum of the squares error and a polynomial fitting function for the pixels in the block;

identifying the pixel location for each block having a largest reliability measure as the feature point for each block;

providing an input image with an initial shift and rotation relative to the template image;

modifying optical flow constraint equations to account for illumination changes in the input image; and minimizing an energy function formed by weighting a sum of the modified optical flow constraints at locations of the feature points of the template image to determine a shift and rotation between the template image and the input for determining misalignments between the template image and the input image for an inspection process, the minimizing step being performed at locations of the feature points of the template image to determine the shift and rotation between the template image and the input image.

6. The method as recited in claim 5, wherein the step of minimizing an energy function formed by weighting a sum of the modified optical flow constraints at locations of the feature points further comprises the steps of:

calculating a Hessian matrix and a gradient vector of the energy function based on an initial guess of a shift and a rotation;

updating the initial guess based on the calculating the Hessian matrix and the gradient vector of the energy function; and iteratively recalculating the Hessian matrix and the gradient vector of the energy function until an updated guess is within an acceptable increment from a previous updated guess.

7. The method as recited in claim 5, further comprising the step of smoothing the template image to reduce noise effects.

8. The method as recited in claim 5, wherein the step of modifying optical flow constraint equations further comprises the step of:

incorporating an illumination change factor into the optical flow constraints for accounting for pixel intensity changes due to illumination effects.

9. A method for computer inspection for determining misalignment between an inspection pattern an object with a pattern to be inspected comprising the steps of:

providing a template image for the inspection pattern comprising blocks of pixels;

determining features points on the template image from among blocks of pixels by selecting a pixel location in each block having a largest reliability measure the reliability measure being based upon a sum of the squares error and a polynomial fitting function for the pixels in the block;

averaging pixels in an area surrounding each feature point to reduce noise in the template image;

providing an input image for the object with a pattern to be inspected with an initial shift and rotation guess with respect to the template image;

modifying optical flow constraint equations to account for illumination changes in the input image; and minimizing an energy function formed by weighting a sum of the modified optical flow constraints at locations of the feature points of the template image to determine a shift and rotation between the template image and the input image for determining misalignments between the template image and the input image for an inspection process.

10. The method as recited in claim 9, wherein the step of minimizing an energy function formed by weighting a sum of the modified optical flow constraints at locations of the feature points further comprises the steps of:

calculating a Hessian matrix and a gradient vector of the energy function based on an initial guess of a shift and a rotation;

updating the initial guess based on the calculating the Hessian matrix and the gradient vector of the energy function; and iteratively recalculating the Hessian matrix and the gradient vector of the energy function until an updated guess is within an acceptable increment from a previous updated guess.

11. The method as recited in claim 9, wherein the step of modifying optical flow constraint equations further comprises the step of:

incorporating an illumination change factor into the optical flow constraints for accounting for pixel intensity changes due to illumination effects.

* * * * *